Feb. 25, 1930. B. R. BENJAMIN 1,748,405
TRACTION WHEEL
Filed Aug. 5, 1926
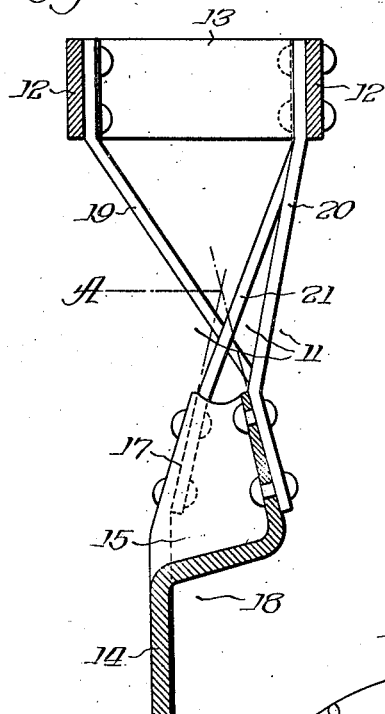
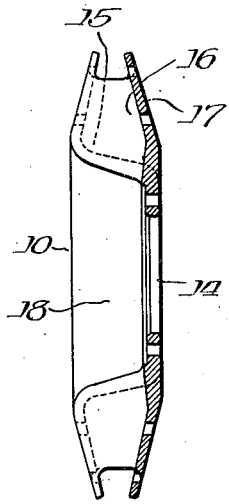
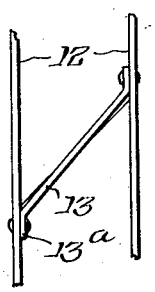
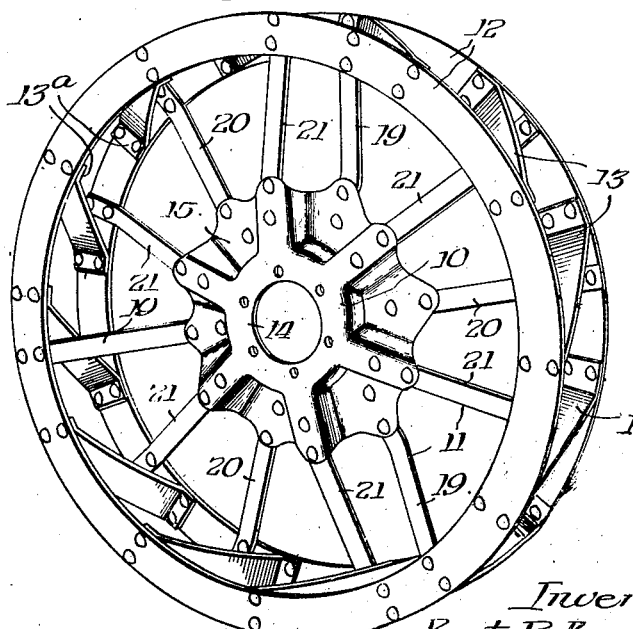
Inventor:
Bert R. Benjamin
By W. P. Doolittle
Atty.

Patented Feb. 25, 1930

1,748,405

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTION WHEEL

Application filed August 5, 1926. Serial No. 127,224.

This invention relates to wheel construction and has for its main object the provision of an all metal traction wheel of light construction that will withstand working stresses, travel on hard surfaces without injury thereto and have efficient gripping action on soft surfaces such as cultivated fields. Another object is to provide a wheel having a single plate-like hub piece which when mounted in reversed position will alter the width of the vehicle tread.

The foregoing and other minor objects are attained by providing a wheel structure having a hub member of novel form comprising radiating spoke seats which are disposed on the circumference of the hub piece in a novel manner as will be more specifically described in the following specification.

Referring to the drawings:

Fig. 1 is a perspective view of a wheel constructed in accordance with the invention;

Fig. 2 is an enlarged sectional view through the radius of the wheel;

Fig. 3 is a detail section of the hub piece; and

Fig. 4 is a detail of the tread.

In the present instance the invention is illustrated as embodied in a wheel intended for use as a traction wheel for farm tractors. In general the novel wheel comprises a unitary disk-like hub piece 10 of concavo-convex form connected by spokes 11 with annular tread plates 12 which are suitably spaced and connected by obliquely extending across tread bars 13 which are preferably of the same width as the annular tread plate 12. The structural features in which the invention resides are the conformation of the hub piece and the manner in which this hub piece may be connected to the spokes and through them to the tread plates.

The hub piece 10 is preferably a steel casting or plate comprising a flat annular central portion 14 designed to be bolted to a suitable wheel support or carrier mounted on the axle of a tractor. This central portion is extended laterally and radially to form a spoke carrying web which is deeply scalloped to provide alternating oppositely facing pockets or depressions 15, 16 equally spaced throughout the circumference of the hub piece and all lying to one side of the plane of the central portion 14 with the bases of alternate seats offset from the central portion. The base wall of each pocket is radially flattened or otherwise shaped to form spoke seats 17 and the alternate seats are inclined towards each other on lines which intersect at points in a circle, as indicated at A Fig. 2, within the diameter of the rim plates 12 and in a plane at one side of and parallel to that of the central portion 14. The lateral position of the pockets 15, with respect to the central portion 14 causes the formation of a deeply dished or concave face 18 on one side of the hub piece which ordinarily, but not necessarily, is the inner side of the wheel, the axle ordinarily extending into the concavity 18 when the wheel is mounted on the end thereof. The arrangement and construction of the pockets and spoke seats about the circumference of the hub piece in this instance is such as to provide for a twelve spoke wheel. In order to provide for comparatively free passage of soil through the tread of the wheel and obviate tendency of soil to pack inside the wheel, only three of the spokes, designated 19, extend to one of the rim plates 12 each of these extending from a seat 17 located on the opposite or far side of the hub piece from that rim plate. These spokes 19 are equally spaced from each other and from three intermediate spokes 20 extending from the same side of the hub piece as the spokes 19 but connected to the other rim plate. Between each of the spokes 19 and 20 there extends a spoke 21. These spokes 21 are connected to the spoke seats opposite those carrying spokes 19 and 20 and extend to the same rim plate as the spokes 20. The hub piece, as seen in Fig. 2, preferably lies between the planes of the respective rim plates 12. The cross plates 13 connecting the rim plates preferably extend obliquely therebetween, as shown in Fig. 4, and are formed with flat end ears 13ª fixed to the inner faces of the rim plates. These cross plates operate as traction lugs or cleats on soft soil.

The construction described results in an open wheel structure in which three fourths of the spokes are directed to one of two spaced rim plates thereby affording free escape on one side of the wheel for soil passing inwardly between the rim plates and through the tread of the wheel. At the same time, a rigid well braced structure is produced, as the structure of the hub piece is particularly efficient in resisting side thrusts. The flat center and generally concavo-convex shape of the hub piece permits it to be attached with either side towards a tractor such reversal having the effect of changing the tread of the tractor or vehicle equipped with wheel having that hub piece. Attention is directed to the fact that the novel hub piece is not limited in use to open tread wheels but may be incorporated in wheels of other types.

While the wheel structure described is illustrative of a preferred form of the invention, certain changes therein are obviously possible without departure from the scope of the invention as defined in the following claims.

What is claimed as new is:

1. A hub piece for traction wheels consisting of a metal plate having a flat central portion either side of which is adapted for attachment to an axle and a radial web which is offset from said central portion laterally and scalloped, each apex of the opposite curves of the scalloped web being inclined on lines converging outwardly to provide radially converging spoke receiving seats.

2. A hub piece for traction wheels consisting of a metal plate formed with a dished central portion the surrounding flange of which is deformed to provide circumferentially staggered spoke seats with the bases of alternate seats offset laterally from the base of the dished portion, alternate spoke seats being formed on lines intersecting in a common radially extending plane.

3. A wheel hub consisting of a metal plate formed with an axial opening surrounded by a flat annular portion and with the metal surrounding said annular portion shaped to form radial spoke receiving seats with alternate seats offset from each other axially of the plate, said seats being inclined on lines converging in a plane at one side of and parallel to the flat annular portion of the plate.

In testimony whereof I affix my signature.

BERT R. BENJAMIN.